(12) United States Patent
Kutscheid et al.

(10) Patent No.: US 10,940,782 B2
(45) Date of Patent: Mar. 9, 2021

(54) VEHICLE BUCKET SEAT, IN PARTICULAR FOR A MOTOR RACING VEHICLE

(71) Applicant: Dr. Ing. h.c. F. Porsche Aktiengesellschaft, Stuttgart (DE)

(72) Inventors: Christoph Kutscheid, Berenbach (DE); Martin Kinscher, Loechgau (DE); Livio Galassi, Stuttgart (IT)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/419,071

(22) Filed: May 22, 2019

(65) Prior Publication Data

US 2019/0359100 A1 Nov. 28, 2019

(30) Foreign Application Priority Data

May 25, 2018 (DE) ...................... 10 2018 112 643.3

(51) Int. Cl.
| | |
|---|---|
| *B60N 2/64* | (2006.01) |
| *B60N 2/90* | (2018.01) |
| *B60N 2/885* | (2018.01) |
| *B60N 2/42* | (2006.01) |
| *B60N 2/68* | (2006.01) |
| *B60N 2/70* | (2006.01) |

(52) U.S. Cl.
CPC ............... *B60N 2/643* (2013.01); *B60N 2/42* (2013.01); *B60N 2/686* (2013.01); *B60N 2/7011* (2013.01); *B60N 2/885* (2018.02); *B60N 2/986* (2018.02)

(58) Field of Classification Search
CPC .......... B60N 2/885; B60N 2/986; B60N 2/42; B60N 2/686; B60N 2/643; B60N 2/7011; B60N 2/90
See application file for complete search history.

(56) References Cited

U.S. PATENT DOCUMENTS

| | | | |
|---|---|---|---|
| 7,560,060 B1* | 7/2009 | Dehart | B60N 2/015 264/258 |
| 8,342,602 B2* | 1/2013 | Bonne | B60N 2/24 297/216.13 |
| 8,342,603 B2 | 1/2013 | Bonne | |
| 2006/0138830 A1* | 6/2006 | Liu | B60N 2/24 297/284.1 |
| 2006/0152065 A1 | 7/2006 | Black | |

FOREIGN PATENT DOCUMENTS

DE 10-2008-045-347 4/2010

OTHER PUBLICATIONS

German Search Report dated Mar. 28, 2019.

\* cited by examiner

*Primary Examiner* — Milton Nelson, Jr.
(74) *Attorney, Agent, or Firm* — Gerald E. Hespos; Michael J. Porco; Matthew T. Hespos

(57) ABSTRACT

A vehicle bucket seat (1) has a seat face (2) and a backrest (3). The backrest (3) has a shoulder support (4) and a head support (5). The shoulder support (4) has a shoulder rest (14) and right and left shoulder flanks (24) arranged to the right and left of the shoulder rest (14) in a laterally projecting manner. The head support (5) has a headrest (15) and right and left head flanks (25) arranged to the right and left of the headrest (15) in a laterally projecting manner. Reinforcing structures (6) run from the head flanks (25) toward an attaching structure (7) on the shoulder rest (14) for fixing the vehicle bucket seat (1) on a vehicle supporting structure.

20 Claims, 5 Drawing Sheets

VEHICLE BUCKET SEAT, IN PARTICULAR FOR A MOTOR RACING VEHICLE

CROSS REFERENCE TO RELATED APPLICATION

This application claims priority under 35 USC 119 to German Patent Appl. No. 10 2018 112 643.3 filed on May 25, 2018, the entire disclosure of which is incorporated herein by reference.

BACKGROUND

Field of the Invention

The invention relates to a vehicle bucket seat, in particular for a motor racing vehicle.

Related Art

Bucket seats provide a particularly firm grip and a high degree of safety for the driver. Very high requirements are made for bucket seats used in motorsport, particular with respect to safety aspects. For example, requirements of this type are stipulated and continuously increased by the FIA (Fédération Internationale de l'Automobile).

However, the bucket seat should not increase the vehicle weight unnecessarily. Thus, a simple addition of material to increase the safety and/or stability of the seat is not an option. In addition, a continuous improvement of the known bucket seats is particularly helpful to have advantages over other participants in sporting competition.

It is therefore an object of the invention to provide an improved bucket seat that can meet the requirements of motorsport (in particular the FIA) while at the same time having a low weight. It also is preferable for the bucket seat to be produced economically.

Further advantages and features of the invention result from the general description and the description of the exemplary embodiments.

SUMMARY

The invention relates to a vehicle bucket seat, particularly, for a motor racing vehicle. The vehicle bucket seat can also be provided for other types of motor vehicles, including passenger cars. The vehicle bucket seat comprises at least one seat face and at least one backrest. The backrest has at least one shoulder support and at least one head support. The shoulder support comprises at least one shoulder rest and shoulder flanks arranged to the right and to the left of the shoulder rest in a laterally projecting manner. The head support comprises at least one headrest and head flanks arranged to the right and to the left of the headrest in a laterally projecting manner. At least one reinforcing structure runs from the head flanks toward an attaching structure that is arranged on the shoulder rest for fixing the vehicle bucket seat on a vehicle supporting structure.

The vehicle bucket seat of the invention affords many advantages, and one considerable advantage is achieved by the reinforcing structure. As a result, the seat meets the requirements of motorsport and, in particular, the FIA. In addition, the seat provides a high degree of safety and stability. Despite the high safety and stability, the seat can be of particularly light configuration due to the reinforcing structure of the invention. It is a further advantage that the reinforcing structure can be implemented in a structurally uncomplicated manner, with the result that the seat can be produced economically.

The reinforcing structure of one embodiment runs along a load path that results from a load introduced as intended into the head support. The reinforcing structure may provide a connection that is direct and/or continuous to a force introduction point in accordance with the load path. The force introduction point may be assigned to the attaching structure or is formed by the attaching structure. The load introduction may correspond to the load cases that are shown in requirements of the FIA. In particular, the reinforcing structure runs along a load path that occurs for a load introduced within the context of a rear push test, a side push test and/or a squeeze test. Thus, a particularly high degree of stability and safety is achieved.

The reinforcing structure may comprise at least one reinforcing rib. This makes particularly uncomplicated production possible, and at the same time provides a particularly advantageous reinforcement. The reinforcing rib may have a rectangular cross-sectional profile, but other cross-sectional profiles are possible. The reinforcing structure can also comprise two, three or more reinforcing ribs.

The reinforcing structure may be unitary with the backrest part. As a result, the stability, weight and production costs can be optimized. The reinforcing structure may be arranged to bear directly against the backrest. An arrangement of the reinforcing structure on the backrest part in a spaced apart manner is also possible.

The reinforcing structure may be of continuous configuration. In particular, the reinforcing structure may have a direct course to the attaching structure, but an indirect course is also possible. The reinforcing structure may be of arcuate configuration, but also can run at least in sections in a straight and/or angled manner. In particular, the reinforcing structure may be configured as an arc and may follow a multi-dimensional arcuate course so that that the curvature of the arc cannot be depicted in one plane. As a result, the reinforcing structure can be guided particularly advantageously from the laterally projecting head flank over to the attaching structure on the shoulder rest.

The reinforcing structure runs at least in sections transversely on the head flank and/or transversely on the headrest and/or transversely on the shoulder rest. Thus, a particularly advantageous load introduction is achieved. The reinforcing structure can also run at least in sections horizontally and/or vertically on the head flank and/or headrest and/or shoulder rest.

The reinforcing structure of one embodiment runs in sections on the head flank in the direction of the headrest, and subsequently runs farther down toward the attaching structure before reaching the headrest. A course of this type has proven particularly advantageous in tests for the load introduction and/or stiffening of the head region of the bucket seat.

The reinforcing structure can be configured as a rotation support or can comprise at least one rotation support of this type. As a result, unfavorable twisting or deforming of the seat in the region of the head support in a load case is counteracted particularly reliably.

The vehicle bucket seat may comprise at least one transverse rib that is arranged on the head support. The transverse rib may extend from one head flank via the headrest as far as the other head flank. In one refinement, the vehicle bucket seat comprises at least one transverse rib that is arranged on the shoulder support part. The transverse rib may extend from one shoulder flank via the shoulder rest and to the other shoulder flank. Transverse ribs of this type provide a particularly advantageous reinforcement or stiffening of the seat. The transverse ribs may be configured at least in sections in one piece with the backrest part. The transverse ribs can also be of separate configuration.

At least one longitudinal rib may be arranged between at least one transverse rib of the head support and at least one transverse rib of the shoulder support to define a tilted H-shaped rib structure with one transverse rib at least partly above another transverse rib. A rib structure of this type has proven particularly advantageous in tests.

The longitudinal rib may runs transversely with respect to the transverse ribs. In particular, the longitudinal rib may run in the vertical direction. In particular, the longitudinal rib may connect the at least one transverse rib of the head support to the at least one transverse rib of the shoulder support. The longitudinal rib can run beyond the transverse rib of the head support and/or beyond the transverse rib of the shoulder support. It is also possible that the longitudinal rib is delimited by the transverse rib of the head support and/or the shoulder support. The longitudinal rib may run via the shoulder rest and/or the headrest.

The attaching structure may be arranged on and/or in at least one transverse rib of the shoulder support to achieve a particularly advantageous fixing of the seat in a vehicle. For example, the attaching structure can be arranged between two transverse ribs that are parallel and/or within one transverse rib that is configured as a double rib. The attaching structure may be in a groove of a transverse rib or may be arranged outside a transverse rib.

The attaching structure may comprise at least two attaching points. In each case at least one reinforcing structure may run to an attaching point to achieve a particularly advantageous load introduction that is as direct as possible into the attaching points. In each case, at least one attaching point may be arranged on a right half and on a left half of the shoulder rest. The attaching points are arranged at the same level on the shoulder rest. For example, the attaching points may be screwing points.

In one preferred refinement, the vehicle bucket seat can comprise at least six attaching points. In particular, the vehicle bucket seat may be a six point seat. As a result, the requirements of bucket seats in motorsport can be met particularly advantageously. In particular, at least two attaching points are provided by way of the attaching structure. In particular, at least four attaching points are arranged on the seat face part.

The vehicle bucket seat may comprise at least two bottom brackets each of which has two attaching points. The attaching structure also may comprise at least one rear bracket that may comprise at least two attaching points. The bottom bracket and/or the rear bracket may be configured for a screw connection.

The vehicle bucket seat can comprise at least one inner shell and/or at least one outer shell and can comprise at least one cooling device for driver cooling.

The seat face and the backrest can be configured as a single-piece component. The seat face and the backrest can be provided by a seat shell that is configured in one piece. The seat shell can be configured as an inner shell and/or an outer shell or can comprise at least one inner shell and/or one outer shell.

The backrest and/or the seat face may be manufactured from a plastic material and, in particular, from a fiber reinforced plastic material. In particular, the vehicle bucket seat and preferably a seat shell are manufactured from a material of this type, for example, a carbon fiber reinforced plastic.

The invention also relates to a motor vehicle that comprises at least one vehicle bucket seat as described above. A motor vehicle of this type affords many advantages.

Further advantages and features of the present invention result from the exemplary embodiments which will be described in the following text with reference to the appended figures.

DETAILED DESCRIPTION

Figure 1:
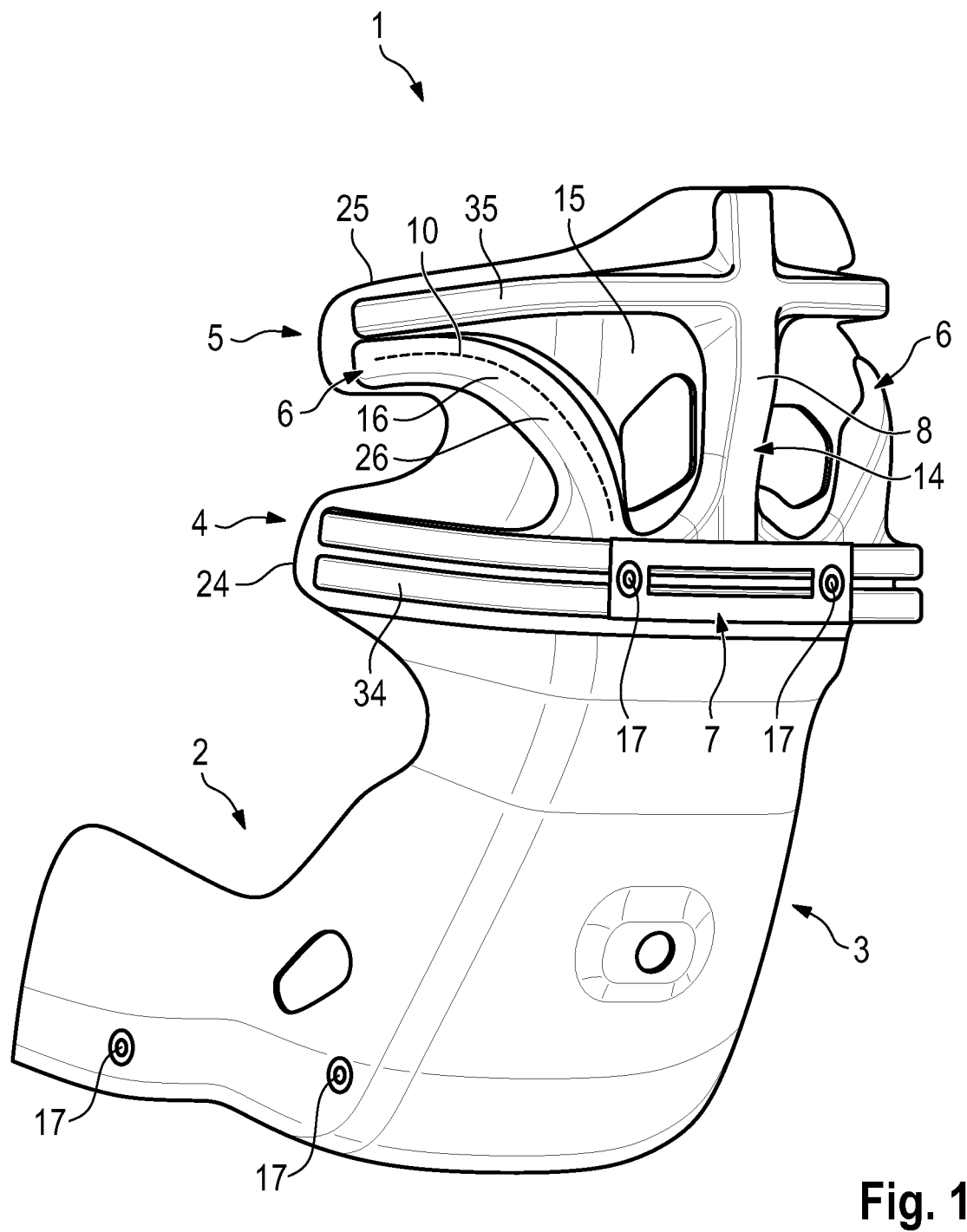
FIG. 1 shows a purely diagrammatic illustration of a vehicle bucket seat according to the invention in a perspective view obliquely from behind.
Figure 2:
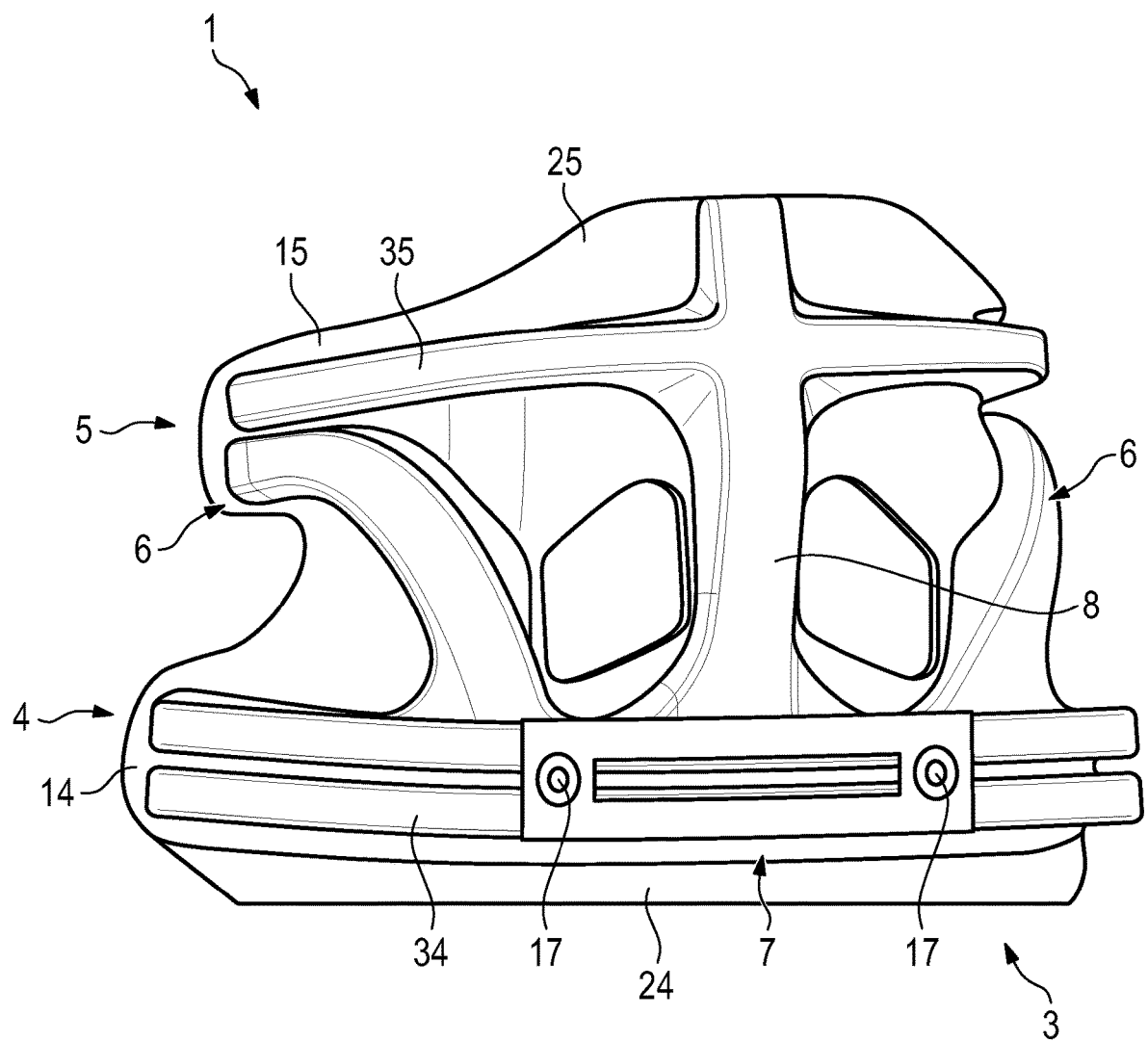
FIG. 2 shows a detailed illustration of the vehicle bucket seat.
Figure 3:
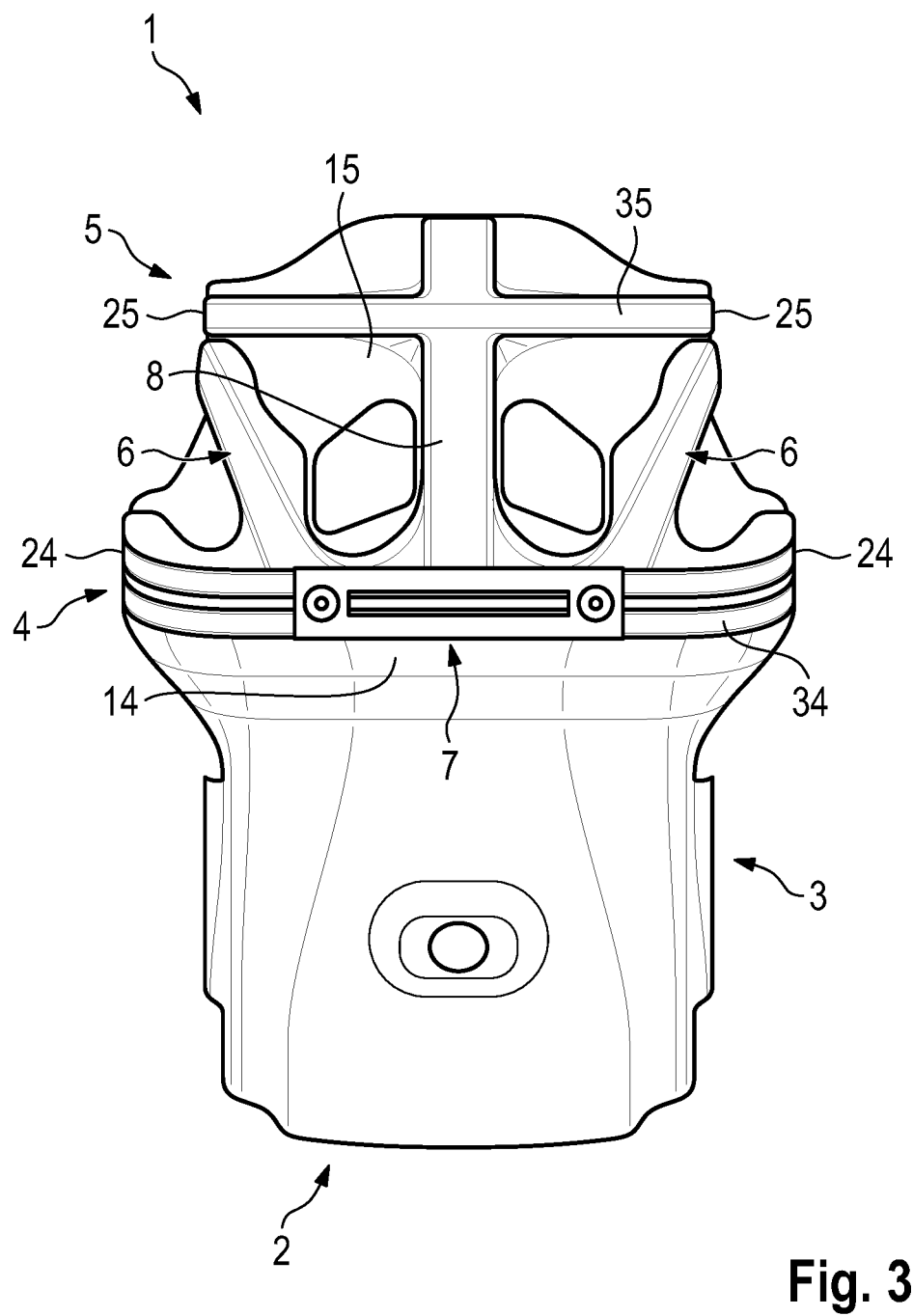
FIG. 3 shows the vehicle bucket seat in a rear view.
Figure 4:
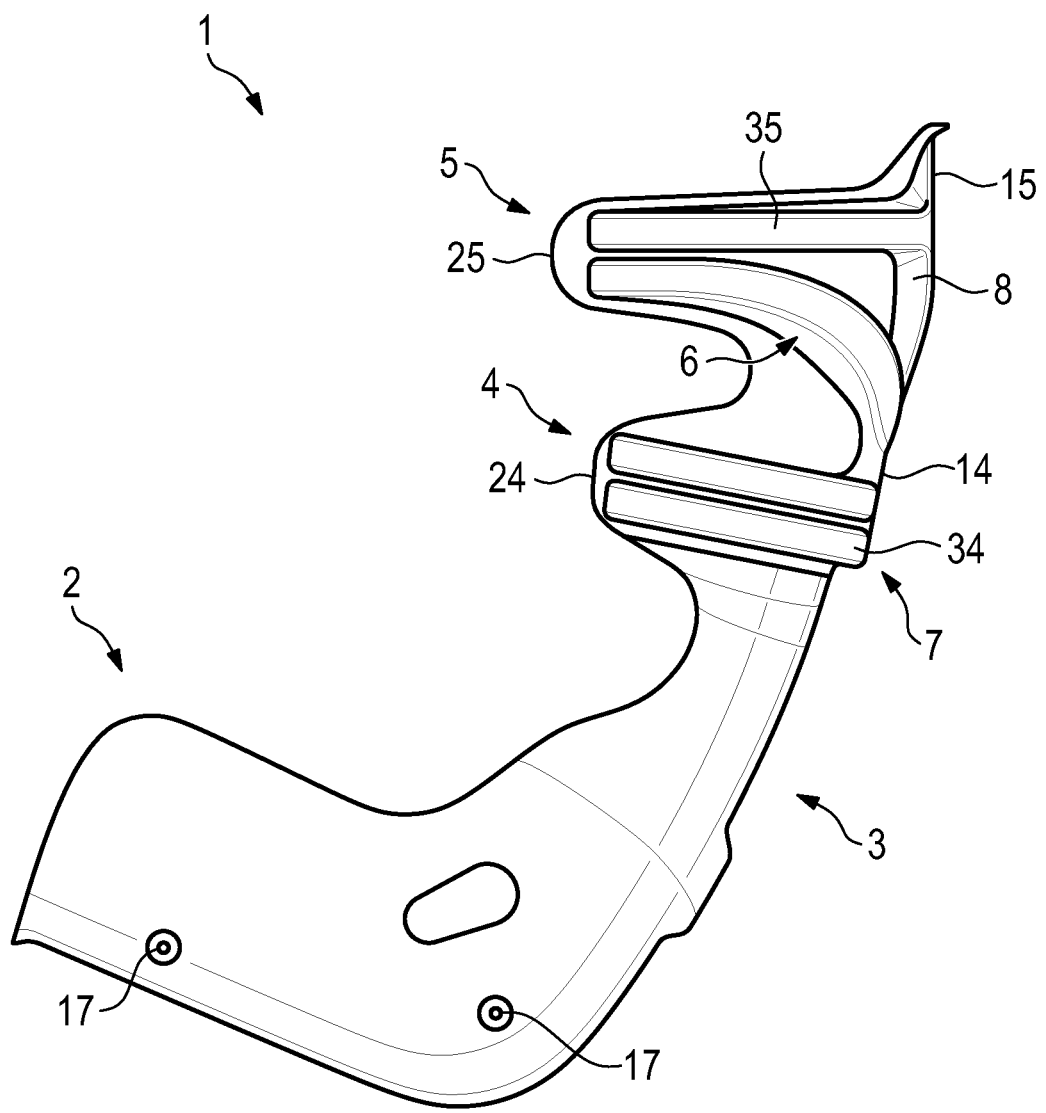
FIG. 4 shows the vehicle bucket seat in a side view.
Figure 5:
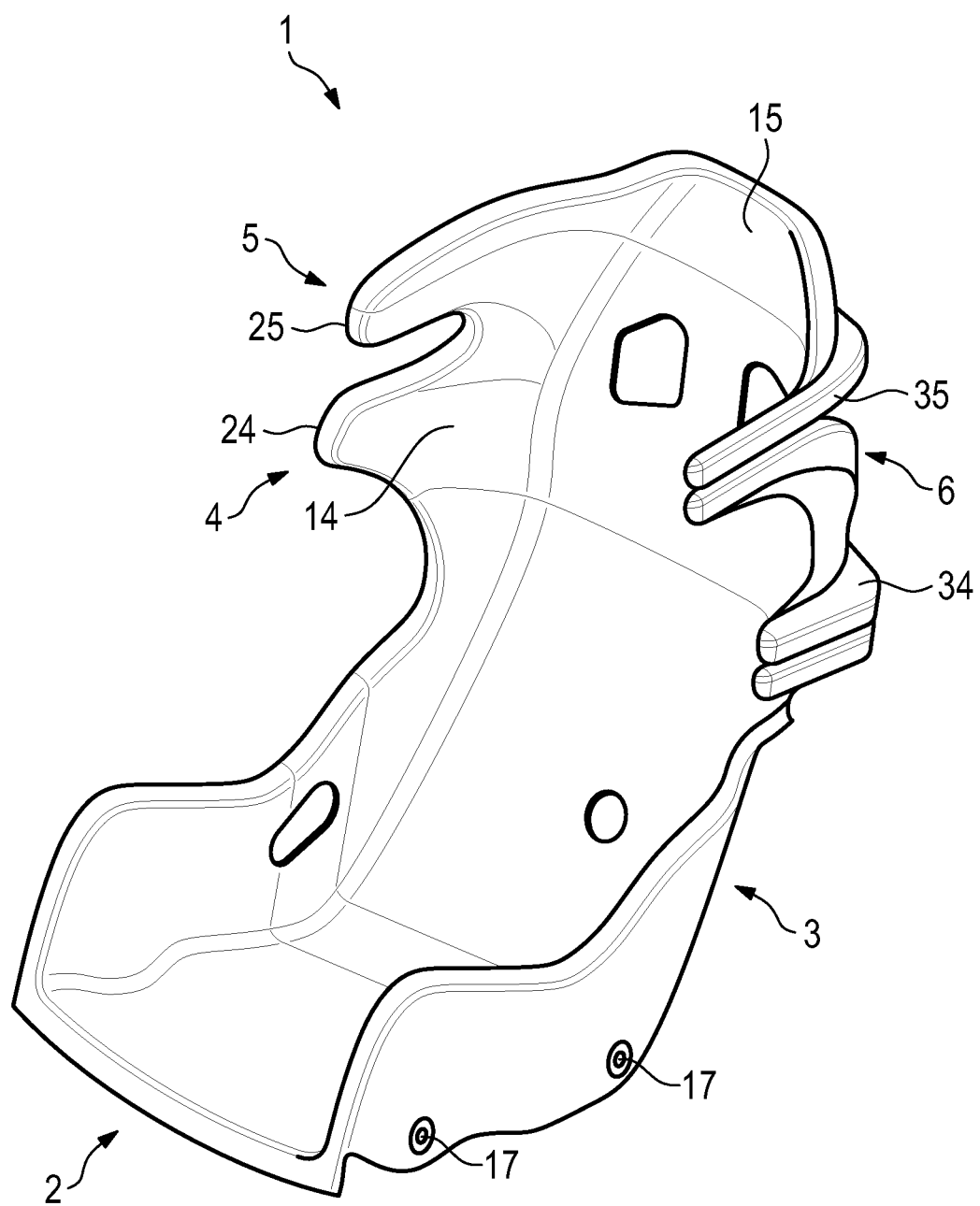
FIG. 5 shows the vehicle bucket seat in a perspective view obliquely from the front.

FIG. 1 shows a vehicle bucket seat 1 according to the invention, as can be used, for example, in a motor racing vehicle. FIGS. 2-5 show the vehicle bucket seat 1 from different perspectives or in different views. The vehicle bucket seat 1 will be described in greater detail in the following text with reference to FIGS. 1-5.

The vehicle bucket seat 1 comprises a seat face 2 and a backrest 3. The backrest part 3 comprises a shoulder support 4 and a head support 5. The shoulder support 4 has a shoulder rest 14, on which in each case one laterally projecting shoulder flank 24 is arranged to the right and to the left. The head support 5 comprises a headrest 15, on which in each case one laterally projecting head flank 25 is arranged to the right and to the left.

The bucket seat 1 is configured as a six-point seat so that high standards in motorsport are met. More particularly, four attaching points 17 are provided on the seat face 2. Two further attaching points 17 are provided by an attaching structure 7 that is arranged on the shoulder rest 14. The six attaching points 17 fix the vehicle bucket seat 1 on a vehicle supporting structure and, for example, on a vehicle shell.

To meet the load cases mentioned in the requirements of the FIA, the vehicle bucket seat 1 is equipped with a reinforcing structure 6. The seat 1 is equipped with two reinforcing structures 6. One reinforcing structure 6 is provided on each seat half, with the reinforcing structures 6 being of substantially identical or mirror-inverted configuration. The reinforcing structures 6 are configured as reinforcing ribs 16. In each case, one reinforcing structure 6 runs from the head flanks 25 toward in each case one attaching point 17 on the shoulder rest 14.

A transverse rib 35 is arranged on the head support part 5 and runs from a right head flank 25 via the headrest 15 as far as a left head flank 25. A transverse rib also is arranged on the shoulder support part 4 and extends from a right shoulder flank 24 via the shoulder rest 14 to a left shoulder flank 24.

A longitudinal rib 8 is arranged between the transverse ribs 34, 35 to define a tilted H-shaped rib structure, which has proven particularly advantageous in tests.

The two attaching points 17 are arranged at the same level in the transverse rib 34 of the shoulder support 4. Additionally, the transverse rib 34 of the shoulder support 4 is configured as a double transverse rib.

The reinforcing structure 6 runs along a load path 10, which is shown here in a greatly simplified form as a dashed line. The load path 10 has been found by evaluation and interpretation of preliminary tests and, for example, within the context of a topology study. The illustrated load path 10 results, for example, in the case of a load introduction as shown in the load cases of the requirements of the FIA.

To follow the load path 10, the reinforcing structure 6 runs in a continuous and arcuate manner from the head flank 25 down to the attaching point 17 that lies on a half of the backrest 3 from which the reinforcing structure 6 begins.

As a result of the illustrated connection between the head flank 25 and the attaching point 17, the reinforcing structure 6 fulfills the function as a rotation support 26. A reinforcing structure 6 of this type and/or a rotation support 26 of this type affords considerable advantages in comparison with known seats. In the case of seats of this type, the rotational movement that is produced in the case of a load introduction in the head region is frequently a serious problem. As a result of said rotation, the lever arm of the pressure ram is increased and the load likewise rises. A consequence of meeting the homologation criteria would then be, for example, additional material in the seat structure. This results in unfavorable weight and production conditions. In contrast, the vehicle bucket seat 1 described and illustrated herein can meet the required load cases in a particularly material-efficient manner.

The invention provides particularly advantageous compliance with the requirements of FIA 8862-2009. It has been possible to demonstrate, within the context of tests and investigations and, for example, topology studies and by way of simulations, that the vehicle bucket seat 1 advantageously complies with or exceeds the three load cases of the rear push test, the side push test and the squeeze test. In addition, the invention which is proposed here meets the requirements in a particularly material-efficient manner. Furthermore, the invention can be produced in a particularly cost-efficient manner and affords considerable optimization with regard to weight and quality.

LIST OF DESIGNATIONS

1 Vehicle bucket seat
2 Seat face
3 Backrest
4 Shoulder support
5 Head support
6 Reinforcing structure
7 Attaching structure
8 Longitudinal rib
10 Load path
14 Shoulder rest
15 Headrest
16 Reinforcing rib
17 Attaching point
24 Shoulder flank
25 Head flank
26 Rotation support
34 Transverse rib
35 Transverse rib

What is claimed is:

1. A vehicle bucket seat, comprising:
   a seat face;
   a backrest opposite the seat face, the backrest having at least one shoulder support and at least one head support arranged above the at least one shoulder support, and the shoulder support comprising a shoulder rest and right and left shoulder flanks arranged respectively right and left of the shoulder rest in a laterally projecting manner, and the head support comprising a headrest and right and left head flanks arranged respectively right and left of the headrest in a laterally projecting manner;
   an attaching structure arranged on the shoulder rest for fixing the vehicle bucket seat to a vehicle support structure; and
   left and right reinforcing structures extending respectively from the left and right head flanks to the attaching structure, the left and right reinforcing structures having a continuous arcuate configuration between the left and right head flanks, respectively, and the attaching structure.

2. The vehicle bucket seat of claim 1, wherein the let and right reinforcing structures runs along a load path to transfer a load from the head support to the attaching structure.

3. The vehicle bucket seat of claim 1, wherein the let and right reinforcing structures are reinforcing ribs.

4. The vehicle bucket seat of claim 1, wherein the let and right reinforcing structures are unitary with the backrest.

5. The vehicle bucket seat of claim 1, wherein the attaching structure comprises at least two attaching points and at least four additional attaching points are provided on the bucket seat.

6. The vehicle bucket seat of claim 1, wherein the left and right reinforcing structures have at least one section that runs transversely on at least one of the head flank, the headrest, and shoulder rest.

7. The vehicle bucket seat of claim 1, a section of each of the left and right reinforcing structures on the head flank runs toward the headrest, and before reaching the headrest runs down toward the attaching structure.

8. The vehicle bucket seat of claim 1, the left and right reinforcing structures are configured as a rotation support.

9. The vehicle bucket seat of claim 1, further comprising at least one transverse rib arranged on the head support and extending from the right head flank via the headrest to the left head flank, and at least one transverse rib arranged on the shoulder support and extending from the right shoulder flank via the shoulder rest to the left shoulder flank.

10. The vehicle bucket seat of claim 1, further comprising at least one longitudinal rib arranged between at least one transverse rib of the head support and at least one transverse rib of the shoulder support to define a tilted H-shaped rib structure.

11. The vehicle bucket seat of claim 1, wherein the attaching structure is arranged on at least one transverse rib of the shoulder support.

12. The vehicle bucket seat of claim 11, wherein the attaching structure comprising at least two attaching points, and each of the reinforcing structures running to one of the attaching points.

13. A vehicle bucket seat, comprising:
   a seat face;
   a backrest opposite the seat face, the backrest having at least one shoulder support and at least one head support arranged above the at least one shoulder support, and the shoulder support comprising a shoulder rest and right and left shoulder flanks arranged respectively right and left of the shoulder rest in a laterally projecting manner, and the head support comprising a headrest and right and left head flanks arranged respectively right and left of the headrest in a laterally projecting manner;
an attaching structure arranged on the shoulder rest for fixing the vehicle bucket seat to a vehicle support structure; and
left and right reinforcing structures extending respectively inward from the left and right head flanks towards the headrest, and before reaching the headrest extending downward to the attaching structure.

14. The vehicle bucket seat of claim 13, wherein the attaching structure is arranged on at least one transverse rib of the shoulder support.

15. The vehicle bucket seat of claim 13, wherein the left and right reinforcing structures runs along a load path to transfer a load from the head support to the attaching structure.

16. The vehicle bucket seat of claim 13, wherein the left and right reinforcing structures are reinforcing ribs.

17. The vehicle bucket seat of claim 13, wherein the left and right reinforcing structures are unitary with the backrest.

18. The vehicle bucket seat of claim 13, wherein the left and right reinforcing structures have at least one section that runs transversely on at least one of the head flank, the headrest, and shoulder rest.

19. The vehicle bucket seat of claim 13, further comprising at least one transverse rib arranged on the head support and extending from the right head flank via the headrest to the left head flank, and at least one transverse rib arranged on the shoulder support and extending from the right shoulder flank via the shoulder rest to the left shoulder flank.

20. The vehicle bucket seat of claim 13, further comprising at least one longitudinal rib arranged between at least one transverse rib of the head support and at least one transverse rib of the shoulder support to define a tilted H-shaped rib structure.

\* \* \* \* \*